United States Patent [19]

Matsubara et al.

[11] Patent Number: 4,890,186

[45] Date of Patent: Dec. 26, 1989

[54] FAULT CURRENT LIMITING DEVICE

[75] Inventors: Chiaki Matsubara; Hirokuni Ishikawa; Masao Ojima, all of Kitakyushu, Japan

[73] Assignee: Kabushiki Kaisha Yaskawa Denki Seisakusho, Fukuoka, Japan

[21] Appl. No.: 310,673

[22] Filed: Feb. 14, 1989

[30] Foreign Application Priority Data

Mar. 2, 1988 [JP] Japan .................................. 63-47524

[51] Int. Cl.[4] ........................................ H02H 5/04

[52] U.S. Cl. ........................................ 361/103; 361/58; 337/15; 337/28; 337/35; 338/20; 338/24

[58] Field of Search .................... 361/58, 103; 337/14, 337/15, 28, 35; 338/13, 20, 24

[56] References Cited

U.S. PATENT DOCUMENTS 3,528,056 9/1970 Voevodsky ....................... 338/13 X

*Primary Examiner*—Derek S. Jennings

*Attorney, Agent, or Firm*—Wenderoth, Lind & Ponack

[57] ABSTRACT

In the past, a power fuse need be replaced after the current limiting operation and cannot be repeatedly used. To solve this problem, there has been proposed a permanent fuse or the like which uses an alkaline metal having a low melting point such as Hg, K, Na, etc.

These are harmful to human body, and since they are completely vaporized, an insulated layer of a vessel cannot be removed, thus giving rise to a difficulty toward higher voltage.

The present invention makes best use of characteristic of carbon which sublimates. A plurality of boundary layers of carbon lumps are disposed in series or in series and parallel, and electrode potential drops at the time of large current and potential drops of arc column under high atmosphere presssure which produces for a short period of time are utilized to effect current limiting.

Despite the fact that materials used comprise carbon, they are harmless to human body, and since the potential drop is utilized, a large insulated layer of the vessel can be used to facilitate the formation of higher voltage. Since the carbon lumps are not fused, repeatable use becomes possible.

16 Claims, 4 Drawing Sheets

FAULT CURRENT LIMITING DEVICE

BACKGROUND OF THE INVENTION AND PRIOR ART

This invention relates to a fault current limiting device, in which in a power circuit, short-circuit current or over-load current at the time of trouble is limited to a predetermined value thereby to reduce a mechanical damage caused by an electromagnetic force and a thermal damage caused by Joule heat, and prevent a secondary disaster resulting from these damages.

As apparatus for limiting short-circuit current at the time of trouble, there have heretofore been existed a power fuse and a disconnecting switch connected in series therewith.

This power fuse has a silver element, and the silver element becomes fused every current limiting operation. Therefore, the power fuse cannot be used repeatedly and need be replaced.

Further, as prior arts which overcome the above-described disadvantage, there are self-restoration type current limiters which use, as a current limiting material, mercury which is a metal having a low melting point (for example, Japanese Patent Publication No. 10643/1962), or alkaline metal (for example, Japanese Patent Publication No. 25432/1971), and a disconnecting switch or a circuit breaker connected in series therewith.

In the above-described self-restoration type current limiter using a low melting point metal, the low melting point metal is vaporized by the self Joule heat in the short-circuit current and changed into a plasma having a high temperature and high atmospheric pressure to produce a current limiting function. Therefore, a high pressure resisting vessel having an insulating portion becomes necessary, giving rise to a problem to a higher voltage.

Moreover, the low melting point metal material used includes those which adversely affect on the human body and have a strong reaction property, which has to be handled with care.

On the other hand, with an increase in power demand, rated current which is always normal load current also increases. Therefore, in the case of the aforementioned conventional fuse, if a design is made with rated current increased, there poses a disadvantage in that the current limiting function is deteriorated.

In view of the foregoing, normally, in the current limiter device, measures are taken as mentioned below so as not to lower the current limiting function.

That is, a load current carrying portion is separated from a current limiting portion, the load current carrying portion using a contact which is opened and closed rapidly. A load current carrying conductor is fused quickly by an explosive.

Alternatively, there is a method in which a load current carrying portion and a current limiting portion are integrally formed, and cooling fins are separately disposed or cooling water is circulated in order to suppress heat-generation caused by energization (Unexamined Publication Japanese Patent Application No. 134354/1979).

SUMMARY OF THE INVENTION

The present invention is based on the above-described system in which a load current carrying portion is separated from a current limiting portion. It is an object of the present invention to provide a current limiter which need not be replaced as in a conventional fuse but it can be used repeatedly.

It is a further object of the present invention to provide a current limiter which is different from a conventional self-restoration type fuse in principle and in which a required current limiting effect may be induced within a closed or open vessel of an insulator toward a higher voltage, and in which the human body is not adversely affected by a current limiting material used.

For achieving the aforementioned task, the present invention provides an arrangement comprising a current limiting member wherein an insulated vessel having a pair of electrodes disposed, a plurality of materials which sublimate in a high temperature state, for example, carbon or graphite lumps or grains, are electrically disposed in series in contact with each other in a row or a plurality of such series arrangements are placed in contact with each other in parallel mode, between said electrodes, and a movable electrode member which is provided on one or both said pair of electrodes so that a predetermined contact pressure is applied to a boundary layer between the plurality of carbon or graphite lumps or grains of said current limiting member and a required gap is maintained between boundary layers of said plurality of carbon or graphite lumps or grains.

Next, the repeatedly usable current limiting function will be described taking, as an example, the current limiting member in which a plurality of carbon or graphite lumps or grains as materials which sublimate in a high temperature state are electrically placed in contact in series or series and parallel between a pair of electrodes.

FIG. 1 schematically shows a part in which a plurality of carbon lumps are electrically placed in contact with each other in series.

Reference character A designates carbon lumps, which are in the shape of go (the game) stone but spherical, powdery, fibrous and any other shapes can be used. Reference character B designates a current distribution, and C a boundary layer between the carbon lumps.

First, in a low current region, a resistance value $R_o$ of the entire current limiting portion is determined by the sum total of a resistance value $\Sigma r_a$ determined by specific resistance value and the shape thereof and a contact resistance value $\Sigma r_b$ at a boundary layer between the carbon lumps, which value ($r_o = \Sigma r_a + \Sigma r_b$) indicates a high order.

However, in a large current region due to a fault current, at the outset when current first flows, a value of high order to the same extent as that of the aforesaid small current but momentarily, the carbon lumps are heated to a high temperature by Joule heat, and since the temperature resistance coefficient of the carbon lumps is negative, the sum resistance ($\Sigma r_a$) of the carbon lumps abruptly lowers.

This lowering of $\Sigma r_a$ plays a very important part because current of the current limiter is shifted from a load current carrying contact connected in parallel with the current limiter.

Next, the contact resistance portion of the boundary layer between the carbon lumps is given a contact pressure by means of a spring or the like. When current exceeds a predetermined current value, a short gap arc is produced, and a potential drop of an electrode point is produced at opposite ends of the boundary layer.

Generally, a potential drop of an arc between electrodes comprises an anode fall Va, an arc column drop Vb and a cathode fall Vc, value of which is Va+Vb+Vc.

The arc column drop Vb is principally determined according to the distance between electrodes and the kind of medium, but the gradient of potential is generally gentle.

On the other hand, a potential of the anode point and the cathode point is determined according to material of electrode, and the gradient of potential is acute. A multiplicity of acute potential drops are produced electrically in series by the short gas arc produced in the boundary layer between the carbon lumps.

The polarity of the potential drop is a potential opposite in polarity to that of a power supply voltage which limits fault current.

Next, the short gap arc produced in the boundary layer between the carbon lumps causes the carbon layer to be sublimated at a high temperature, produces a vaporized pressure in a space of the boundary layer, moves a movable electrode, and forms a required gap in the boundary layer to increase said arc column drop Vb.

The arc column drop Vb has a short gap but has a large vaporized pressure in a space, and therefore, a required potential drop is expected. This function increasingly increases the current limiting function.

FIG. 3 collectively shows the aforementioned current limiting function.

In FIG. 3, V represents a power supply voltage, R a circuit impedance, I a fault current, $r_o$ the sum total of resistance portion of a current limiting member, and (Va+Vb+Vc)×n the sum total when the n number of electrode potential drops and arc column drops are in series mode.

At the outset of occurrence of fault current, a load current carrying contact S is connected in parallel with the present current limiter, and fault current I at that time is I=V/R.

When the contact S is activated to be opened by a driving device of a contact S separately installed not shown in FIG. 3, said current limiter is to be inserted in series into the circuit, and the fault current is limited into $$I=(V-(V_a+V_b+V_c)\times n)/(R+r_o)$$

The repeatedly usable function will be described hereinafter.

As the material which has a conductivity and sublimates at a high temperature, there can be mentioned carbon. Main electric characteristics in the boundary layer in carbon lumps are as follows:

(1) No fusion welding and formation of oxide film are present.

(2) Even if the surface is consumed by arc, it may maintain a relatively smoothness.

(3) Contact resistance under light contact pressure is relatively large.

(4) Since a short gap arc is produced as compared with other metals, minimal length arc current $I_{min}$ as needed is extremely small.

The greatest function of the repeating use is that fusion does not occur in the boundary layer (characteristic (1). In the case of other metals, fusion occurs, and solidification occurs. A boundary layer between metal lumps is not formed, failing to perform the repeating use.

With respect to the characteristic (2), even if the surface is consumed by the arc, the boundary layer is smooth. Therefore, the electric field is not concentrated in the insulation pressure resistance after the current limiting operation. Higher voltage may be used.

With respect to the characteristic (3), according to the present invention, particularly, in a large current region, a load current carrying contact is provided in parallel to thereby solve the problem.

With respect to the characteristic (4), the short gap arc tends to occur beginning from a small current, and an electrode drop which is the current limiting function tends to occur beginning from a small current. In the present invention, a contact pressure is applied so as to determine a timing of starting current limiting as required.

DESCRIPTION OF THE PREFERRED EMBODIMENTS

First, an embodiment for achieving the aforesaid object of the present invention will be described hereinafter.

Figure 4:
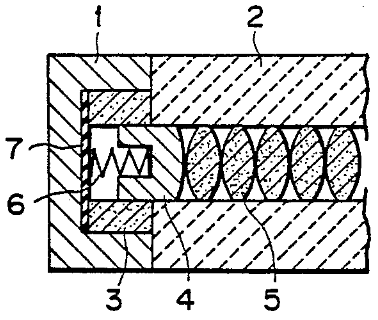
FIG. 4 is a sectional view of an embodiment according to the present invention.
Figure 5:
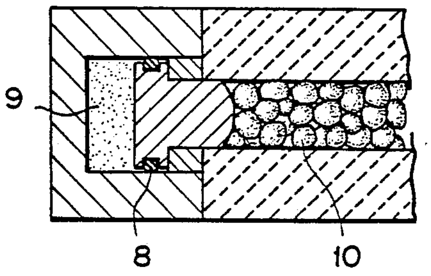
FIG. 5 is a sectional view of a further embodiment according to the present invention.
Figure 6:
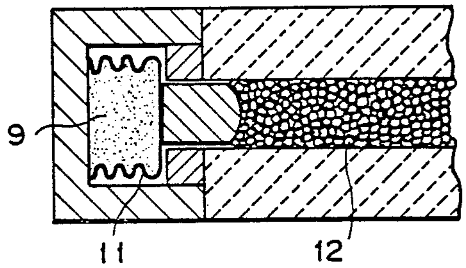
FIG. 6 is a sectional view of another embodiment according to the present invention.

FIGS. 4 to 6 respectively show embodiments according to the present invention. Reference numeral 1 designates an electrode which also serves as a vessel at the end. 2 designates a tubular vessel from an insulating material, in which carbon lumps are accommodated within an inner space thereof, the lumps being in the shape of go stones in the embodiment shown in FIG. 4, in the spherical shape in the embodiment shown in FIG. 5, and in the powdery shape in the embodiment shown in FIG. 6.

Reference numeral 3 designates a carbon electrode in the shape of a ring, which is secured to the electrode 1 by shrinkage fitting, screws and the like. Reference numeral 4 designates a movable electrode made of carbon, of which outer diameter is smaller than the inner diameter of the electrode 3 and designed so as to form a clearance.

The carbon movable electrode member 4 uses a spring 6 in the FIG. 4 embodiment, a compressed gas 9 and an O-ring 8 in the FIG. 5 embodiment and a compressed gas 9 and a bellows 11 in the FIG. 6 embodiment so that at the time of non-energization and at the time of small current, contact pressure is applied, and at the time of energizing large current, a required gap is formed under sublimated vaporized pressure when an electrode potential drop occurs.

Figure 9:
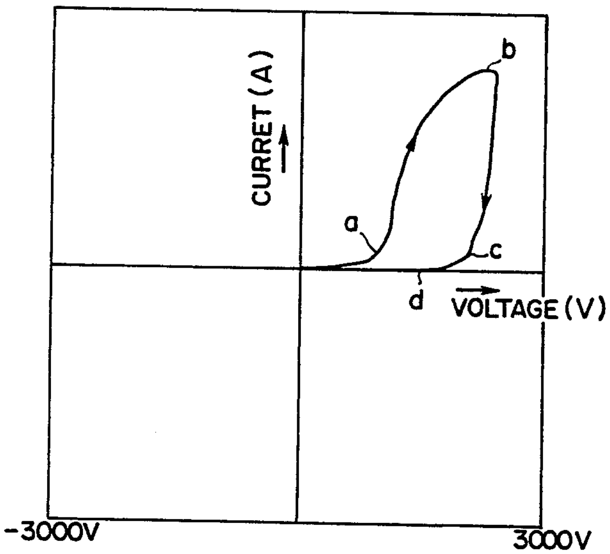
FIG. 9 shows the voltage-current characteristic waveforms of the current limiting characteristic shown in FIG. 8.
Figure 8A:
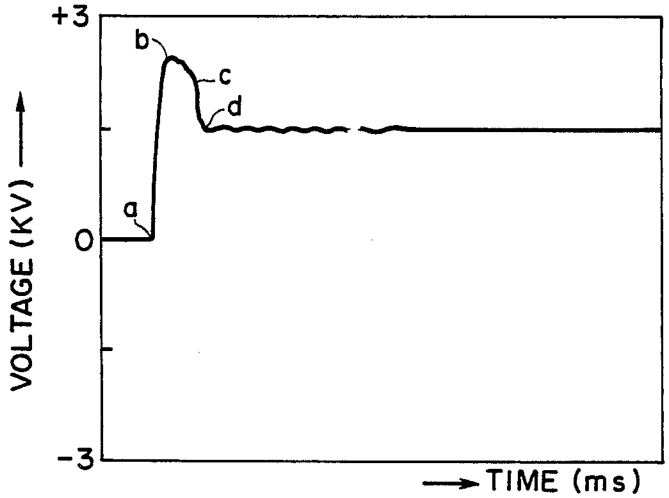
FIGS. 8-*a*, 8-*b* and 8-*c* show voltage, current and resistance characteristics, respectively, showing the operation of the current limiting circuit shown in FIG. 1.
Figure 8B:
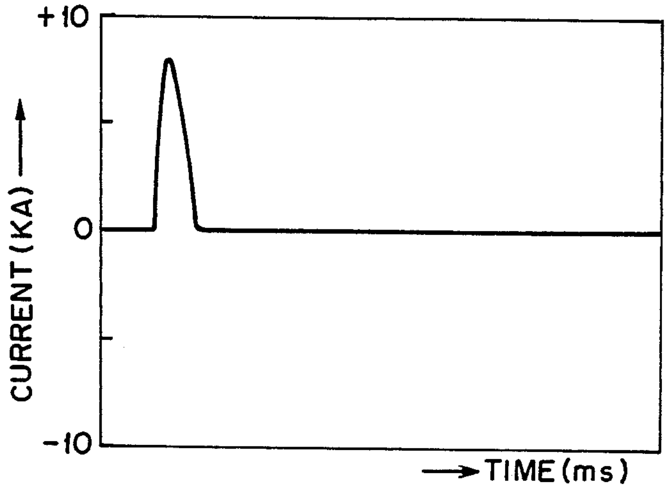
Figure 8C:
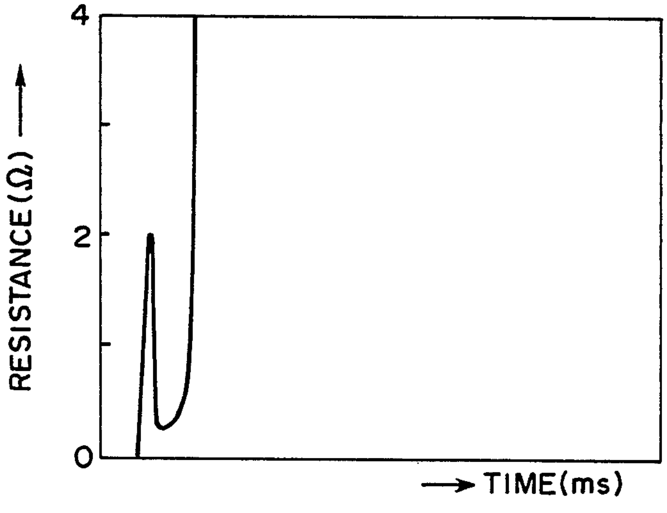

In the above-described embodiments, the actual operating waveforms formed when the spring 6 shown in FIG. 4 is applied as a vessel or a movable electrode member, and a plurality of spherical lumps shown in FIG. 5 are applied as carbon lumps are shown in FIGS. 8-*a*, 8-*b* and 8-*c* and FIG. 9.

Figure 1:
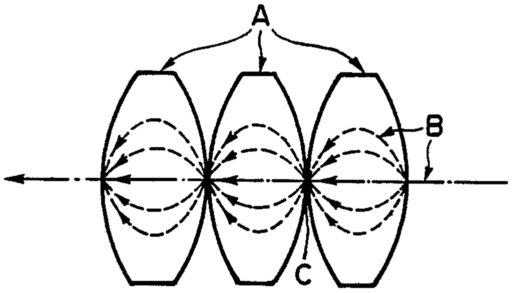
FIG. 1 is a view for explaining the principle of the present invention.
Figure 2:
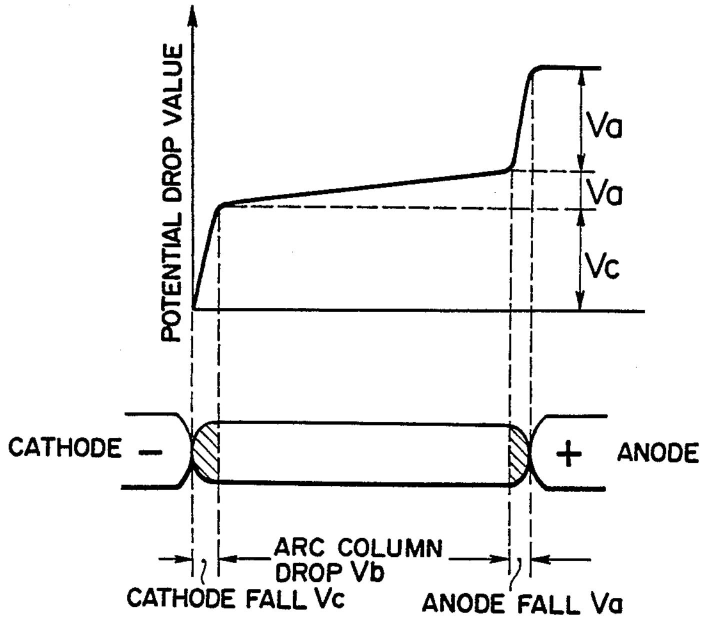
FIG. 2. is a view showing the potential drop characteristics of an arc between electrodes.
Figure 3:
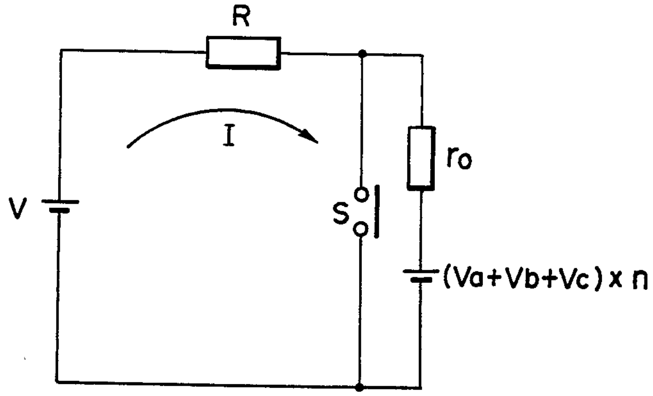
FIG. 3 shows a current limiting circuit.
Figure 7:
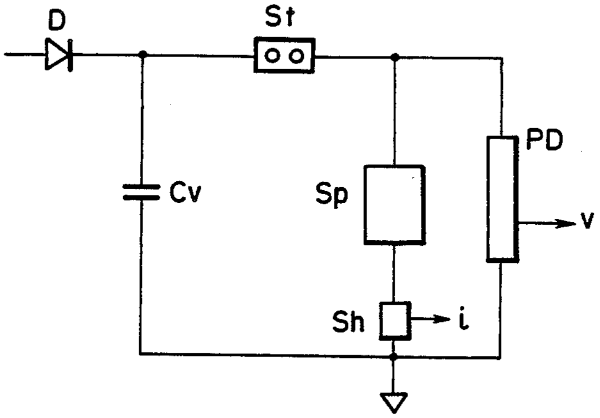
FIG. 7 is an equivalent circuit of a current limiting circuit which uses a product according to the present invention.

An experimental circuit is of a system in which as shown in FIG. 7, a high voltage capacitor Cv is charged through a high voltage diode D, and the charged electric charge of the Cv is discharged to a sampling unit Sp (which has no load current carrying contact and a disconnecting contact, and only the current limiting member in the present invention is set) through a closing unit St to cause a dc large current to flow.

In measurement, a shunt Sh is connected in series with the sampling unit Sp to measure current i and a voltage divider PD is connected in parallel with the sampling unit Sp to measure voltage v.

It is also designed so that a waveform processing computer outputs momentary resistance value r (=v/i), voltage-current characteristics.

As output waveforms, FIGS. 8-*a*, 8-*b* and 8-*c* respectively show waveforms v, i and r with respect to time, and FIG. 9 shows the voltage-current characteristics at that time.

FIGS. 8-*a* to 8-*c* show the current limiting waveform of dc large current when a charge voltage to the high voltage capacitor Cv is 3 KV.

First, at the beginning of load current carrying large current, the sum total of resistance r of the current limiting member (sampling unit Sp) is approximately 2.0 ohm and current rises, and the resistance r rapidly lowers to 0.25 ohm since the temperature resistance coefficient is negative due to Joule heat (from point a to point b in FIG. 9).

Next, a plurality of electrode potential drops occur in the carbon lumps to form a required gap in the layer. Arc column drops are added to the electrode potential drops and the voltage v between terminals in the current limiting member is approximately constant whereby current is greatly limited, and the resistance r rapidly increases (from point b to point c in FIG. 9).

As the resistance r increases, the current i assumes zero due to the current limiting function, and a residual charge in the high voltage capacitor Cv is kept being applied to the current limiting member (sampling unit Sp) (point d in FIG. 9).

With the operation as described above, the current limiting and extinction action are carried out positively. It has been confirmed even by the experiments that the aforementioned operation is continuously tested five times at intervals of about 1 minute to obtain the same waveform to render repeated use possible.

FIG. 9 shows the voltage-current characteristic which is the same as conventional ZnO, SiO varisters from the original point to points a and b, showing the non-linear characteristics. In the case where the current limiting member of the present invention is regarded as an element, it can be said a non-linear resistance element. The current limiting function from point b to point c has the same operating waveform as that of the conventional self-restoration type current limiter but the extinction action from point c to point d and the disconnecting action after point d comprise a highly important action of the present invention, which exhibit effects such that even if the surface is consumed by the arc which is the electric characteristic of carbon, the smoothness is maintained, and the movable electrode member is disposed so that the required gap is maintained by the sublimated vaporized pressure. The arrangement of the load current carrying contact parallel with the current limiting member and the arrangement of the disconnecting contact in series means the security of safety.

As described above, according to the present invention, replacement of the device is not required as in the conventional power fuse but it can be repeatedly used. Since material harmful to the human body is not used as in the self-restoration type current limiter, the practicality during the course of production is great. As the operating principle, the metal is not completely vaporized but the electrode potential drop is utilized, and therefore a pressure resisting vessel having a large insulating layer can be easily used to render higher voltage usable. Furthermore, since the device has an electric conductivity which is the characteristic of carbon and is sublimated at a high temperature, no fusion in the boundary layer between carbon lumps occurs to render repeated use thereof possible. Since the movable electrode member is disposed so that at the time of small current or at the time of non-energization, the required contact pressure is applied to the carbon lumps, and at the time of large current, the required gap is connected by the sublimated vaporized pressure, the current limiting start time or current limiting value, extinction and disconnection performances may be secured.

What is claimed is;

1. A fault current limiting device a tubular vessel formed from an insulated body, electrodes formed of a conductive material provided on opposite ends of said tubular vessel, ànd materials sublimated at a high temperature provided within said tubular vessel and accommodated while being placed in contact with each other so as to provide an electric conduction from one electrode to the other.

2. A fault current limiting device according to claim 1, wherein said materials sublimated at a high temperature comprise carbon.

3. A fault current limiting device according to claim 1, wherein said materials sublimated at a high temperature are accommodated in the tubular vessel while being electrically placed in contact with each other in a row.

4. A fault current limiting device according to claim 1, wherein said materials sublimated at a high temperature are electrically placed in contact with each other in a row, and a plurality of such materials are accommodated in the tubular vessel while being connected to parallel.

5. A fault current limiting device according to claim 1, wherein there is provided a slidable body formed of a conductive material and having one end brought into contact with an inner wall of an electrode and having another end brought into contact with the material sublimated at a high temperature provided in a hollow portion of the tubular vessel, and wherein an elastic body is provided between said inner wall of the electrode and said slidable body.

6. A fault current limiting device according to claim 5, wherein said elastic body comprises a spring.

7. A fault current limiting device according to claim 1, wherein the material sublimated at a high temperature comprises carbon grains or graphite grains.

8. A fault current limiting device according to claim 2, wherein said materials sublimated at a high temperature are accommodated in the tubular vessel while being electrically placed in contact with each other in a row.

9. A fault current limiting device according to claim 2, wherein said materials sublimated at a high temperature are electrically placed in contact with each other in a row, and a plurality of such materials are accommodated in the tubular vessel while being connected to parallel.

10. A fault current limiting device according to claim 3, wherein said materials sublimated at a high temperature are electrically placed in contact with each other in a row, and a plurality of such materials are accommodated in the tubular vessel while being connected to parallel.

11. A fault current limiting device according to claim 8, wherein said materials sublimated at a high temperature are electrically placed in contact with each other in a row, and a plurality of such materials are accommodated in the tubular vessel while being connected to parallel.

12. A fault current limiting device according to claim 2 respectively, wherein there is provided a slidable body formed of a conductive material and having one end brought into contact with an inner wall of an electrode and having another end brought into contact with the material sublimated at a high temperature provided in a hollow portion of the tubular vessel, and wherein an elastic body is provided between said inner wall of the electrode and said slidable body.

13. A fault current limiting device according to claim 3 respectively, wherein there is provided a slidable body formed of a conductive material and having one end brought into contact with an inner wall of an electrode and having another end brought into contact with the material sublimated at a high temperature provided in a hollow portion of the tubular vessel, and wherein an elastic body is provided between said inner wall of the electrode and said slidable body.

14. A fault current limiting device according to claim 4 respectively, wherein there is provided a slidable body formed of a conductive material and having one end brought into contact with an inner wall of an electrode and having another end brought into contact with the material sublimated at a high temperature provided in a hollow portion of the tubular vessel, and wherein an elastic body is provided between said inner wall of the electrode and said slidable body.

15. A fault current limiting device according to claim 2, wherein the material sublimated at a high temperature comprises carbon grains or graphite grains.

16. A fault current limiting device according to claim 3, wherein the material sublimated at a high temperature comprises carbon grains or graphite grains.

* * * * *